US006260263B1

(12) United States Patent
Haase

(10) Patent No.: US 6,260,263 B1
(45) Date of Patent: Jul. 17, 2001

(54) TRUSS TABLE WITH FLIPPER

(75) Inventor: Christopher L. Haase, Elburn, IL (US)

(73) Assignee: MiTek Holdings, Inc., Wilmington, DE (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/943,963

(22) Filed: Oct. 6, 1997

(51) Int. Cl.[7] .................................................... B23P 21/00

(52) U.S. Cl. ............................ 29/772; 29/281.3; 29/429; 227/152

(58) Field of Search .................................. 29/281.5, 772, 29/798, 432, 281.3, 429, 464, 467, 468, 716, 430, 432.2; 227/152

(56) References Cited

U.S. PATENT DOCUMENTS

| | | | |
|---|---|---|---|
| 3,100,301 * | 8/1963 | Black | 29/281.3 |
| 3,751,794 * | 8/1973 | Kay | 29/526 |
| 3,785,277 | 1/1974 | Schmitt . | |
| 4,394,952 * | 7/1983 | Crane | 227/7 |
| 4,623,083 * | 11/1986 | Pagano | 227/152 |
| 4,645,113 | 2/1987 | Webber . | |
| 4,824,004 * | 4/1989 | Hanson | 227/152 |
| 4,846,923 | 7/1989 | Lines . | |
| 5,379,513 | 1/1995 | Thompson et al. . | |
| 5,600,882 * | 2/1997 | Beane | 29/822 |
| 5,617,622 | 4/1997 | Anderson . | |

FOREIGN PATENT DOCUMENTS

| | | |
|---|---|---|
| 1 258 792 | 1/1968 | (DE) . |
| 24-48 545 | 4/1976 | (DE) . |
| 2 773 097 | 7/1999 | (FR) . |

OTHER PUBLICATIONS

EPO European Serach Report, dated Apr. 17, 2000, 4 pgs.

* cited by examiner

*Primary Examiner*—P. W. Echols
*Assistant Examiner*—Steve Blount
(74) *Attorney, Agent, or Firm*—Senniger, Powers, Leavitt & Roedel

(57) ABSTRACT

Truss table assembly for assembling a truss without manual flipping of the truss. In one embodiment, the truss table assembly includes two truss tables and two flipper arms. Each truss table has a worksurface that is configured to support the truss members as nailing plates are engaged to the truss members. The flipper arms are configured to flip the truss from a truss member first surface in contact with the worksurfaces to a second surface in contact with the worksurfaces so that nailing plates may be positioned over the truss member second surface and engaged to the truss members.

21 Claims, 2 Drawing Sheets

TRUSS TABLE WITH FLIPPER

FIELD OF THE INVENTION

This invention relates generally to an assembly for use in the manufacture of trusses and, more particularly, to an assembly and methods for assembling a prefabricated truss.

BACKGROUND OF THE INVENTION

Prefabricated trusses are often used in the construction of building structures because of their strength, reliability, low cost, and ease of use. The trusses are typically assembled in a factory using machinery for mass-fabrication of individual truss components. The trusses are assembled, for example, on large assembly tables and then shipped to construction sites.

A prefabricated truss typically includes truss members coupled by nailing plates. Each truss member has a first surface and a second surface, and the truss members are pre-cut for a pre-defined truss configuration. In assembling the truss, the truss members are arranged on a long assembly table and nailing plates are placed over the first surface of the truss members. The plates are then secured to the truss members using, for example, a roller or a vertical press. The truss is then manually flipped over and nailing plates are positioned over the second face of the truss members and secured thereto. The completed truss is then removed from the assembly table.

Manually flipping the truss is labor intensive and subjects the truss to a variety of potential sources of damage. Due to the size and weight of the truss, several workers may be required to flip the truss. This task is complicated by the incomplete state of the truss as the workers must take extra precautions to maintain the relative flatness of the truss. Also, any bending or twisting of the partially completed truss during the flipping operation may weaken the grip of the nailing plates on the first surface of the truss.

It would be desirable to provide an assembly which enables fabricating a truss without requiring that the truss be manually flipped. It would also be desirable to provide an assembly for automated flipping of a truss which does not subject the truss to any significant bending or twisting.

SUMMARY OF THE INVENTION

These and other objects may be attained by a truss table assembly which, in one embodiment, includes at least two truss tables and at least two flipper arms for flipping the truss after a first set of nailing plates have been engaged to the truss. More particularly, each truss table includes first and second worksurfaces and inner rails and outer rails to clamp the truss members in position over the respective worksurfaces. Each flipper arm includes a flipper member and a spur. One end of the flipper arm is rotatably coupled to a truss table and the flipper member includes a support surface to support the truss during flipping. The spur, or stop member, extends from the flipper member support surface and limits movement of the truss along the support surface. In one embodiment, a first flipper arm is positioned between the first worksurfaces of the first and second truss tables and a second flipper arm is positioned between the second worksurfaces of the first and second truss tables. The flipper arms are positioned relative to each other such that as flipper arms are rotated to the vertical position, the respective support surfaces are substantially aligned.

To fabricate a truss using the above described truss table assembly, the truss members are positioned on the truss table assembly first worksurfaces so that at least one of the truss members extends over the first flipper arm. The first worksurface rails are moved towards the truss members to clamp, or trap, the members in place. Nailing plates are then positioned over the truss member first surfaces and are engaged to the truss using, for example, a roller or a vertical press. The first worksurface rails are then moved away from the truss members so that the members are no longer clamped in place. The truss is then raised from the truss table first worksurfaces by rotating the first flipper arm. As the flipper arm is rotated to a substantially vertical position, the second flipper arm also is rotated toward a vertical position. As the first flipper arm rotates, the truss slides along the flipper arm support surface until the truss contacts the spur. The spur prevents the truss from sliding further down the first flipper arm and supports the truss. When the first flipper arm reaches the substantially vertical position, the truss begins to move away, or separate from, the first flipper arm. The second flipper arm is in position so that the truss is received by and comes to rest on the flipper member support surface of the second flipper arm. The second flipper arm is then rotated to a horizontal position and the truss is supported by the second worksurfaces. The second worksurfaces rails are then moved towards the truss members to clamp the truss. Nailing plates are then positioned over the truss member second surfaces and engaged to the truss. The second worksurface rails are then moved away from the truss members so that the truss is no longer clamped in place. The truss is then removed from the truss assembly.

The above described assembly facilitates fabricating a truss without requiring that the truss be manually flipped. In addition, such assembly flips the truss without subjecting the truss to any significant bending or twisting.

DETAILED DESCRIPTION

Figure 1:
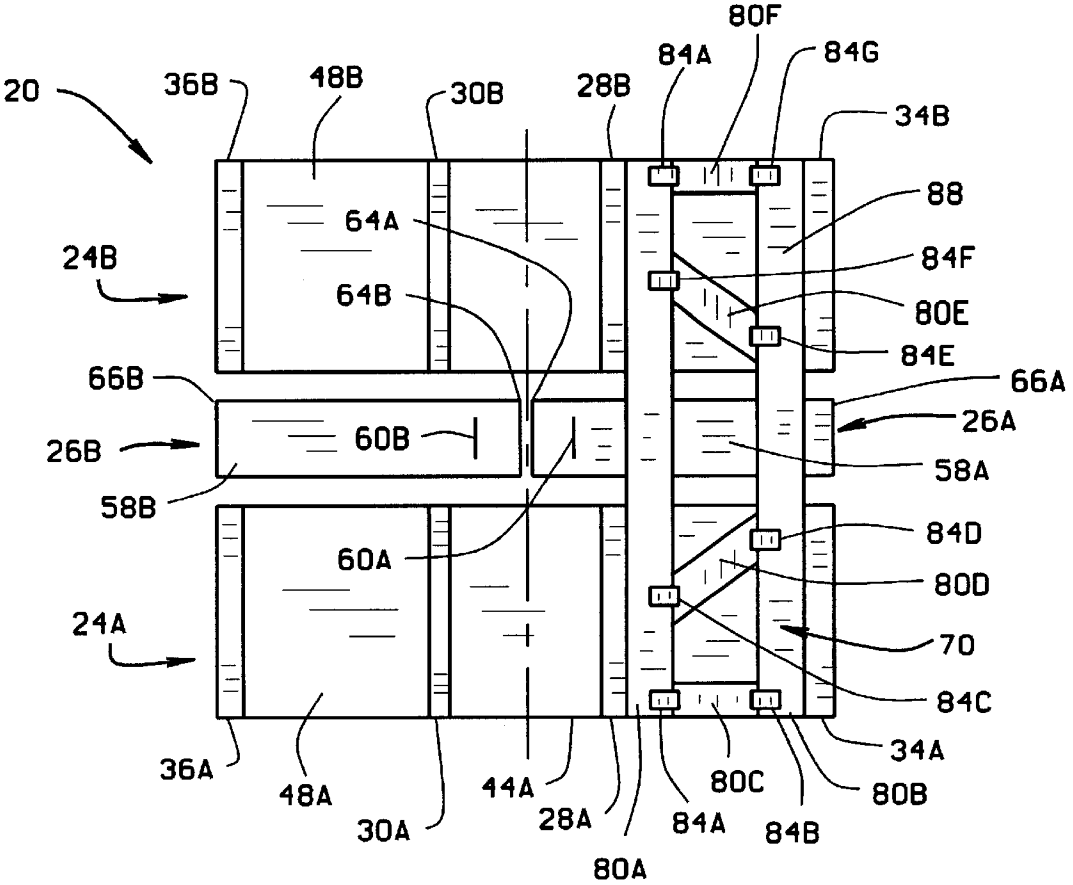
FIG. 1 is a top plan view of a truss table assembly in accordance with one embodiment of the present invention.
Figure 2:
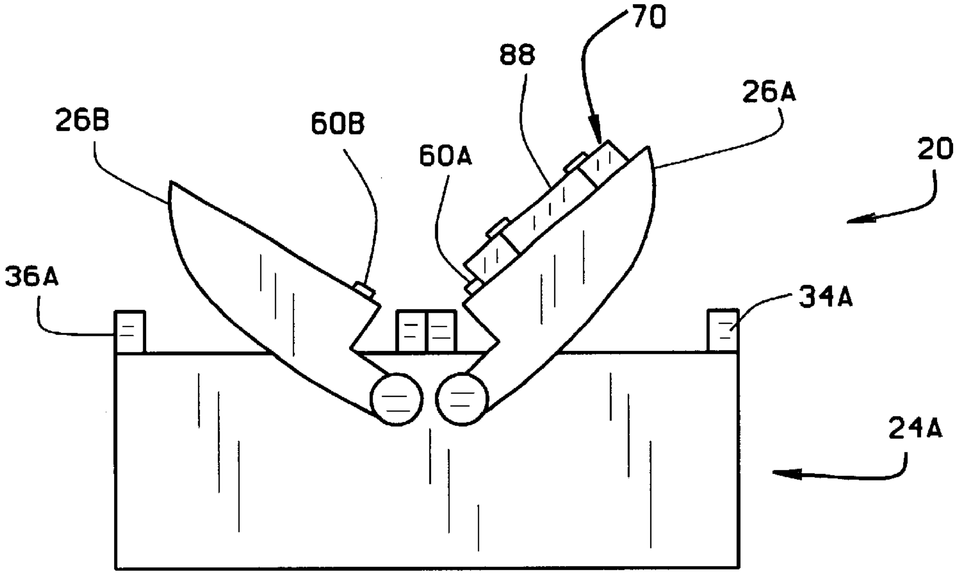
FIG. 2 is a cross section view of the truss table assembly shown in FIG. 1, with the flipper arms partially rotated towards a vertical position.

FIG. 1 is a top plan view of a truss table assembly 20 in accordance with one embodiment of the present invention. Truss table assembly 20 includes truss tables 24A and 24B, flipper arms 26A and 26B, inner rails 28A, 28B, 30A, and 30B, and outer rails 34A, 34B, 36A, and 36B. Truss tables 24A and 24B include respective first worksurfaces 44A and 44B, and respective second worksurfaces 48A and 48B. First worksurfaces 44A and 44B and second worksurfaces 48A and 48B lie on opposing sides of longitudinal axis 52. Inner rails 28A and 28B and outer rails 34A and 34B are movably coupled to respective first worksurfaces 44A and 44B. Inner rails 30A and 30B and outer rails 36A and 36B are movably coupled to respective second worksurfaces 48A and 48B.

Flipper arms 26A and 26B include respective flipper members 58A and 58B and respective spurs, or stop members, 60A and 60B. Flipper members 58A and 58B include respective first ends 64A and 64B, respective second ends 66A and 66B, and respective support surfaces 68A and 68B extending therefrom. Flipper arms 26A and 26B are positioned between truss tables 24A and 24B and below worksurfaces 44A, 44B, 48A, and 48B. Particularly, flipper arm 26A is positioned between first worksurfaces 44A and 44B. Flipper arm 26B is positioned between second worksurfaces 48A and 48B. Flipper arms 26A and 26B are rotatable and move between a substantially horizontal position to a substantially vertical position relative to truss tables 24A and 24B to flip truss. Spurs 60A and 60B extend from respective support surfaces 68A and 68B and support truss 70 so that truss 70 passes over inner rails 28A, 28B, 30A, and 30B as truss 70 is flipped. Flipper arms 26A and 26B are made of steel or similar material capable of supporting weight of truss 70.

Generally, truss members 80A, 80B, 80C, 80D, 80E, and 80F are placed on truss table assembly 20 and nailing plates 84A, 84B, 84C, 84D, 84E, 84F, 84G, and 84H are placed over upwardly facing truss first surface 88. Nailing plates 84A, 84B, 84C, 84D, 84E, 84F, 84G, and 84H are then secured to truss members 80A, 80B, 80C, 80D, 80E, and 80F, for example, by rolling or pressing. Truss 70 is then flipped by flipper arms 26A and 26B, and nailing plates (not shown) are placed over truss second surface (not shown) and secured to truss members 80A, 80B, 80C, 80D, 80E, and 80F. More particularly, truss members 80A, 80B, 80C, 80D, 80E, and 80F are positioned on truss table assembly 20 such that truss member intersections (not shown) are positioned on truss tables 24A or 24B. Inner rails 28A and 28B are moved towards respective outer rails 34A and 34B so that truss members 80A, 80B, 80C, 80D, 80E, and 80F are clamped therebetween. Nailing plates 84A, 84B, 84C, 84D, 84E, 84F, 84G, and 84H are then placed over the truss member intersections (not shown) and secured to truss members 80A, 80B, 80C, 80D, 80E, and 80F, typically with a roller or a vertical press (not shown).

Inner rails 28A and 28B are then moved away from truss 70 adjacent to longitudinal axis 52. Flipper arm 26A is then rotated from a substantially horizontal position below first worksurfaces 44A and 44B to a substantially vertical position. As flipper arm 26A is rotated, truss 70 is raised from respective truss tables 24A and 24B, and flipper arm 26B is rotated from a substantially horizontal position below respective truss tables 24A and 24B to a less than vertical position. As arm 26A rotates, truss 70 slides along flipper arm support surface 68A until truss 70 is in contact with, and supported by spur 60A. As flipper arm 26A and truss 70 approach a relatively vertical position, truss 70 begins to move away, or separate, from flipper arm 26A. Flipper arm 26B is rotated so that truss 70 is received by and comes to rest on flipper arm support surface 68B. Flipper arms 26A and 26B are returned to substantially horizontal positions below respective truss tables 24A and 24B. As flipper arm 26B is repositioned below respective truss tables 24A and 24B, truss 70 is supported by and lies on second worksurfaces 48A and 48B. As a result, truss 70 second surface (not shown) is now upwardly facing. Inner rails 30A and 30B are moved towards respective outer rails 36A and 36B such that truss 70 is clamped therebetween. Second face nailing plates (not shown) are positioned at truss member intersections (not shown) and secured in a manner similar to nailing plates 84A, 84B, 84C, 84D, 84E, 84F, 84G, and 84H. Inner rails 30A and 30B are then moved away from truss 70 adjacent to longitudinal axis 52, and truss 70 may be removed from truss table assembly 20.

Figure 3:
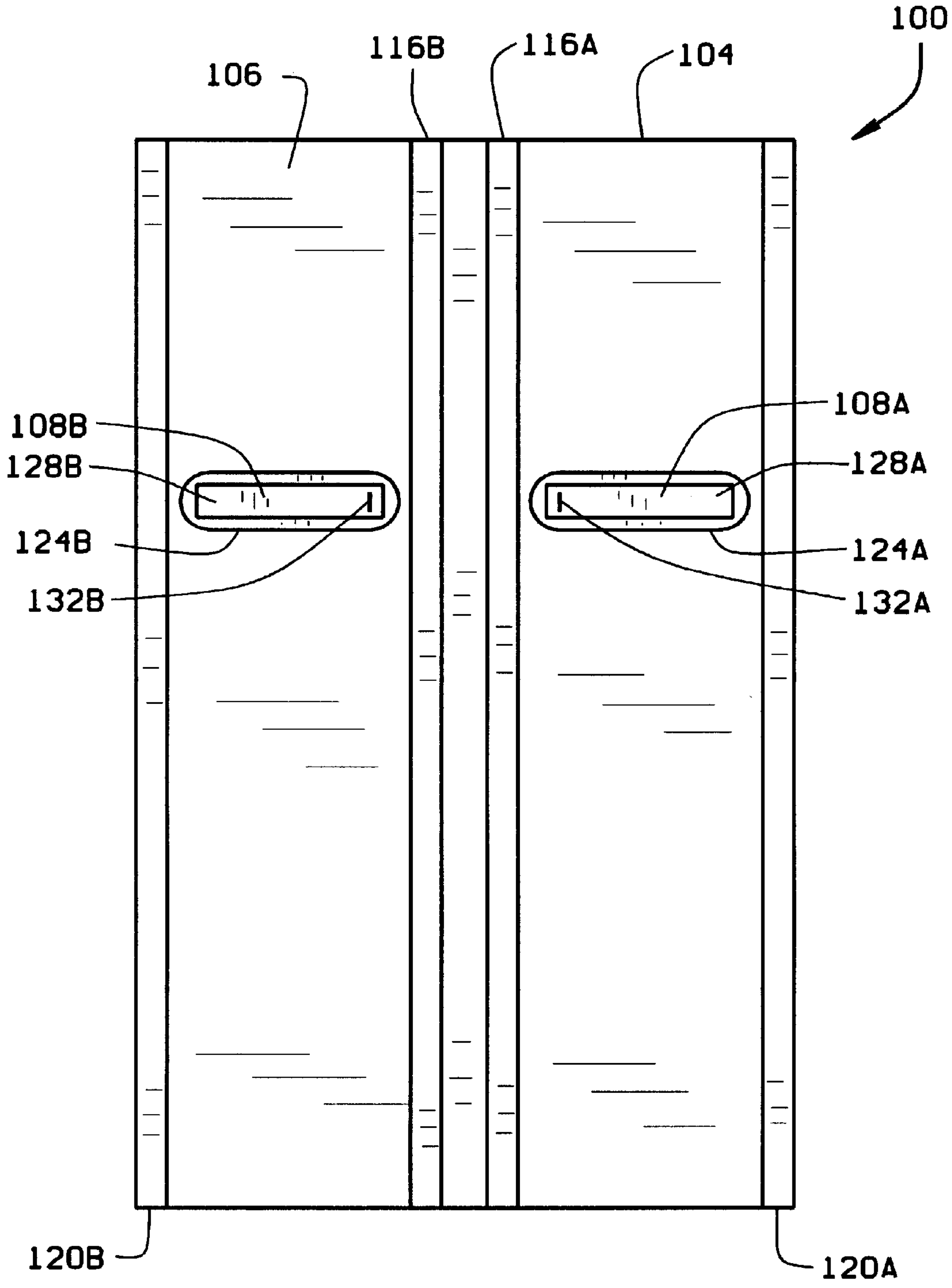
FIG. 3 is an alternative embodiment which illustrates a worksurface that has flipper arm openings extending therethrough.

In an alternative embodiment shown in FIG. 3, a truss table assembly 100 includes a truss table 104 having a worksurface 106, flipper arms 108A and 108B, inner rails 116A and 116B, and outer rails 120A and 120B. Worksurface 106 includes flipper arm openings 124A and 124B extending therethrough. Flipper arms 108A and 108B include respective flipper members 128A and 128B and respective spurs, or stop members, 132A and 132B. Flipper arms 108A and 108B are positioned below flipper arm openings 124A and 124B. Inner and outer rails 116A, 116B, 120A, and 120B extend an entire length of truss table 104 and are movably coupled to worksurface 106.

The above-described assembly facilitates fabricating a truss without requiring that the truss be manually flipped. In addition, such assembly flips the truss without subjecting the truss to any significant bending or twisting.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, the truss assembly was described as a serial process. Such truss table assembly may, however, also be utilized to assemble multiple trusses simultaneously. For example, after securing the nailing plates to the truss members and flipping the truss, truss members from a second truss could be positioned on the first worksurface of the truss tables. The first and second trusses could then be simultaneously clamped by the rails and the nailing plates positioned such that the roller or press secures the nailing plates in the first and second truss simultaneously. After moving the rails, the first completed truss could be removed from the truss table assembly and the second truss could be flipped. This method of operation could significantly increase production rates. Additionally, the truss table assembly may include any number of truss tables and flipper arms depending upon the size of the truss to be assembled. Accordingly, the spirit and scope of the invention are to be limited only by the terms of the appended claims.

What is claimed is:

1. A truss table assembly for use in connection with assembling a truss, said truss table assembly comprising:

at least one truss table comprising a substantially horizontal worksurface on which the truss may be positioned;

a first flipper arm positioned relative to said worksurface for flipping the truss, said first flipper arm movable between a substantially horizontal position and a substantially vertical position; and a second flipper arm positioned relative to said worksurface for receiving the truss, said second flipper arm movable between a substantially horizontal position and a substantially vertical position, said first flipper arm configured to move the truss from a substantially horizontal position to at least a substantially vertical position, and said second flipper arm configured to receive the truss from said first flipper arm and move the truss from a substantially vertical position to a substantially horizontal position.

2. A truss table assembly in accordance with claim 1 wherein said truss table assembly comprises at least two truss tables, said tables spaced so that said first and said second flipper arms are interposed between said tables.

3. A truss table assembly in accordance with claim 1 wherein each said flipper arm comprises a spur, each said spur configured to support the truss as the truss is flipped.

4. A truss table assembly in accordance with claim 1 wherein said at least one truss table further comprises at least one movable inner rail and at least one movable outer rail, said rails configured to clamp the truss.

5. A truss table assembly in accordance with claim 1 wherein each said flipper arm is positioned adjacent said truss table worksurface.

6. A truss table assembly in accordance with claim 1 wherein said at least one truss table comprises a first worksurface and a second worksurface, said first and said second flipper arms configured to flip the truss from said first worksurface to said second worksurface.

7. A truss table assembly in accordance with claim 6 wherein said first and second worksurfaces each comprises a movable inner rail and a movable outer rail configured to clamp the truss.

8. A truss table assembly in accordance with claim 2 wherein said truss table assembly comprises a plurality of second flipper arms positioned relative to said worksurface for flipping the truss, said plurality of second flipper arms positioned to move the truss from a substantially vertical position to a substantially horizontal position.

9. A truss table assembly in accordance with claim 1 wherein said worksurface comprises at least two openings, said first and said second flipper arms positioned to extend through said at least two openings.

10. A truss table assembly in accordance with claim 1 wherein each said first and said second flipper arm comprises a flipper member, said flipper member comprising a first end, a second end, and a support surface extending between said first and second ends, said first end configured to be rotatably coupled to the truss table, said surface configured to support the truss.

11. A truss table assembly in accordance with claim 10 wherein said flipper member further comprises a spur extending from said flipper member support surface, said spur configured to support the truss.

12. A truss table assembly in accordance with claim 1 wherein said truss table assembly comprises a plurality of first flipper arms positioned relative to said worksurface for flipping the truss, said plurality of first flipper arms positioned to move the truss from a substantially horizontal position to a substantially vertical position.

13. A truss table assembly in accordance with claim 12 wherein said truss table assembly comprises a plurality of second flipper arms positioned relative to said worksurface for flipping the truss, said plurality of second flipper arms positioned to move the truss from a substantially vertical position to a substantially horizontal position.

14. A truss table assembly for use in connection with assembling a truss, said truss table assembly comprising:

a first truss table;

a second truss table spaced apart from said first truss table, each said truss table comprising corresponding first and second substantially horizontal worksurfaces on which the truss may be positioned;

a first flipper arm positioned between said first worksurfaces of said first and second truss tables, said first flipper arm movable between a substantially horizontal position and a substantially vertical position; and a second flipper arm positioned between said second worksurfaces of said first and second truss tables, said second flipper arm movable between a substantially horizontal position and a substantially vertical position, said first flipper arm configured to move the truss from a substantially horizontal position on said first worksurface to at least a substantially vertical position, and said second flipper arm configured to receive the truss from said first flipper arm and move the truss from a substantially vertical position to a substantially horizontal position on said second worksurface.

15. A truss table assembly in accordance with claim 14 wherein each said first and said second flipper arm comprises a flipper member, said flipper member comprising a first end, a second end, and a support surface extending between said first and second ends, said first end configured to be rotatably coupled to said truss table, said surface configured to support the truss.

16. A truss table assembly in accordance with claim 15 wherein said flipper member further comprises a spur extending from said flipper member support surface, said spur configured to support the truss.

17. A truss table assembly in accordance with claim 14 wherein said first and second truss tables each further comprises at least one movable inner rail and at least one movable outer rail, said rails configured to clamp the truss.

18. A truss table assembly for use in connection with assembling a truss, said truss table assembly comprising:

at least one truss table comprising a first substantially horizontal worksurface and a second substantially horizontal worksurface on which the truss may be positioned, said first and said second worksurfaces each comprising an opening;

a first flipper arm positioned to extend through said opening in said first worksurface, said first flipper arm movable between a substantially horizontal position and a substantially vertical position; and a second flipper arm positioned to extend through said opening in said second worksurface, said second flipper arm movable between a substantially horizontal position and a substantially vertical position, said first flipper arm configured to move the truss from a substantially horizontal position on said first worksurface to at least a substantially vertical position, and said second flipper arm configured to receive the truss from said first flipper arm and move the truss from a substantially vertical position to a substantially horizontal position on said second worksurface.

19. A truss table assembly in accordance with claim 18 wherein each said first and said second flipper arm comprises a flipper member, said flipper member comprising a first end, a second end, and a support surface extending between said first and second ends, said first end configured to be rotatably coupled to said at least one truss table, said surface configured to support the truss.

20. A truss table assembly in accordance with claim 19 wherein said flipper member further comprises a spur extending from said flipper member support surface, said spur configured to support the truss.

21. A truss table assembly in accordance with claim 18 wherein said at least one truss table further comprises at least one movable inner rail and at least one movable outer rail, said rails configured to clamp the truss.

* * * * *